UNITED STATES PATENT OFFICE.

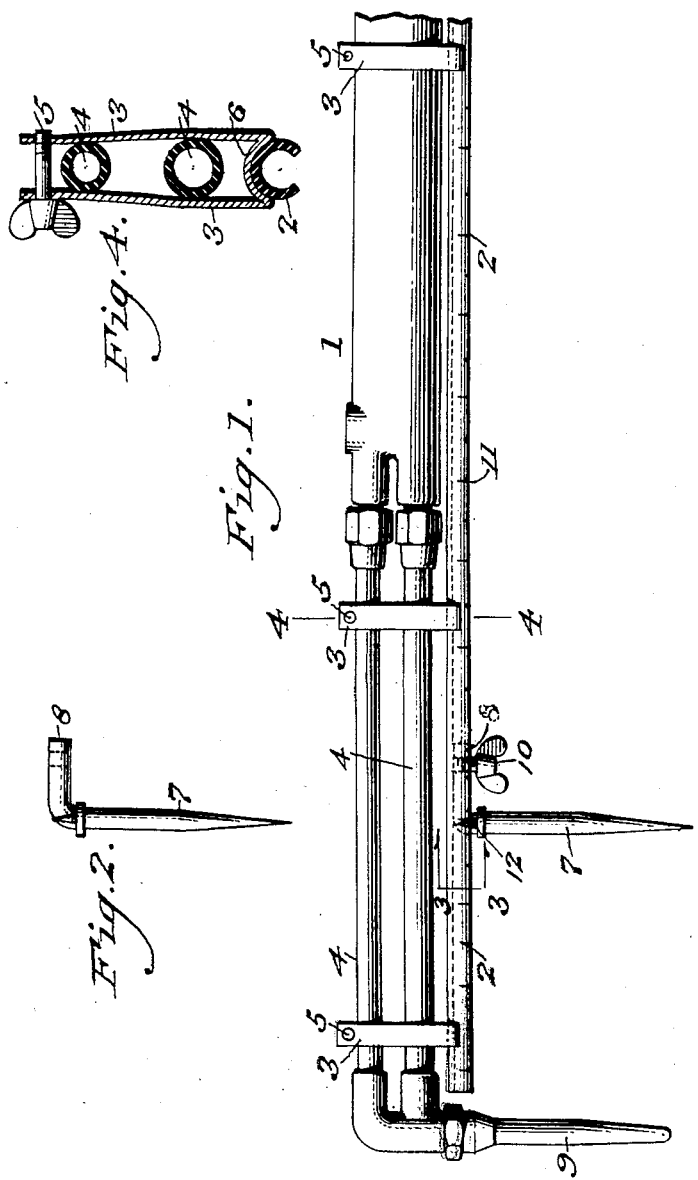

FRANK F. DAVIS, OF CHESTER, PENNSYLVANIA.

OXYACETYLENE, CARBOHYDROGEN, OR THE LIKE TORCH.

1,359,155. Specification of Letters Patent. Patented Nov. 16, 1920.

Application filed January 17, 1919. Serial No. 271,564.

*To all whom it may concern:*

Be it known that I, FRANK F. DAVIS, a citizen of the United States, residing at Chester, in the county of Delaware, State of Pennsylvania, have invented a new and useful Oxyacetylene, Carbohydrogen, or the like Torch, of which the following is a specification.

My invention relates to a torch of the order of oxyacetylene, carbohydrogen, or the like, the chemical action of the gas of which is adapted to cut metal, and it consists of an attachment to such torch whereby the latter is adapted to be rotated, to effect the cutting of the metal in sections of circular form.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a side elevation of a torch embodying my invention.

Fig. 2 represents a side elevation of a detached member thereof.

Fig. 3 represents a vertical section thereof on an enlarged scale, on line 3—3 Fig. 1.

Fig. 4 represents a vertical section thereof on an enlarged scale, on line 4—4 Fig. 1.

Similar numerals of reference indicate corresponding parts in the figures.

Referring to the drawings.

1 designates a torch of the order of an oxyacetylene, carbohydrogen, or the like gas adapted to cut metal, the same excepting the features of my invention applied thereto being of conventional form.

2 designates a channeled bar or longitudinally divided tube which is carried by the hangers 3 from the members 4 of the torch, said hangers being formed of opposite separate pieces adapted to be clamped to said members by the screws or bolts 5 which engage the upper portions of said pieces, the lower portions whereof are joined by the curved bases 6 to whose under sides the crown of the channeled bar 2 is brazed or soldered. By this provision the bar 2 is firmly held suspended in position beneath adjacent portions of the torch.

7 designates a pin which I denominate as a center pin, the same having on its upper end the elbow 8 which is fitted in the channel of the bar 2, said channel forming a runway for said elbow by which provision the pin 7 may be moved to and from the discharge nozzle 9 of the torch parallel therewith and so adjusted relatively thereto for a purpose to be hereinafter described.

In order to retain said pin in the position to which it is set or adjusted, I employ a fastening device such as the screw 10 which is fitted to the elbow 8 and adapted to tighten against the under side of the crown of the bar 2, the division of said bar allowing the shank of said screw to pass therethrough into said elbow.

On the side of the bar 2 are marked the graduations 11 and to the head of the pin 7 is secured the index finger 12 which is adapted to point to the desired graduation in order to set the pin with precision at the required distance from the nozzle 9.

It will be seen that when it is desired to cut from a metal plate a circular section thereof the diameter of the circle is determined by the position of the pin 7 relatively to the nozzle 9. The pin is placed on the plate and so forms a center for turning the torch thereon in order to describe a required circle. When the torch is so turned, the chemical action of the same at the nozzle cuts from the plate a circular section, this being accomplished in a convenient, uniform, efficient and practical manner.

Having thus described my invention what I claim as new and desire to secure by Letters Patent, is:—

1. An attachment for a torch of the character described, comprising means suspended from the torch, and a pin supported from said means independent of the torch to permit of rotation of the torch to effect the describing and cutting of a circular section from the object to which the torch is subjected.

2. An attachment for a torch of the character described, comprising means suspended from the torch, and a pin supported from said means independent of the torch to permit of rotation of the torch to effect the describing and cutting of a circular section from the object to which the torch is subjected, said pin being adjustable within said means.

3. In a torch of the character stated, an attachment for the purpose described comprising a pin indirectly supported from the torch and centered from the nozzle of the torch, a device connectible with and suspended from a member of the torch adapted to carry said pin and permit the latter to be adjusted relative to said nozzle.

4. In a torch of the character stated, an attachment for the purpose described comprising a pin indirectly supported from the torch and centered from the nozzle of the torch, a bar frictionally connectible with and suspended from a member of the torch, said pin having its upper end movably fitted to said bar and adapted to be adjusted thereon relatively to said pin, and means for controlling said pin in its adjusted position.

5. In a torch of the character stated, an attachment for the purpose described comprising a pin indirectly supported from the torch and centered from the nozzle of the torch, a runway connected with a member of the torch, said pin having an elbow which is movably fitted to said runway adapting said pin to be adjusted relatively to said pin, and a screw-like member on said elbow adapted to engage said runway.

6. In a torch of the character stated, an attachment for the purpose described, comprising a pin indirectly supported from the torch and centered from the nozzle of the torch, a bar to which said pin is movably fitted adapting it to be adjusted relative to said nozzle, means for retaining said pin in adjusted position, hangers adapted to carry said bar and being provided with means for connection with a member of the torch, and means on said pin adapted for retaining the latter in adjusted position.

7. In a torch of the character stated, an attachment for the purpose described comprising a pin indirectly supported from the torch and centered from the nozzle of the torch, a bar adapted to be suspended from and connected therewith, said bar having graduations thereon, and an index finger on said pin adapted to point to said graduations.

FRANK F. DAVIS.

Witnesses:
MYRTLE M. LA RUE,
FLORENCE R. LODGE.